United States Patent
Tani et al.

(10) Patent No.: US 8,694,227 B2
(45) Date of Patent: Apr. 8, 2014

(54) AIR-FUEL RATIO CONTROL APPARATUS AND AIR-FUEL RATIO CONTROL METHOD FOR INTERNAL-COMBUSTION ENGINE

(75) Inventors: Michinori Tani, Wako (JP); Atsuhiro Miyauchi, Wako (JP); Kenichi Maeda, Wako (JP); Seiji Watanabe, Wako (JP); Soichiro Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 13/108,014

(22) Filed: May 16, 2011

(65) Prior Publication Data
US 2011/0320106 A1  Dec. 29, 2011

(30) Foreign Application Priority Data
Jun. 28, 2010  (JP) .................................. 2010-145860

(51) Int. Cl.
*F02D 28/00* (2006.01)
*F02D 1/02* (2006.01)

(52) U.S. Cl.
USPC ............................ 701/104; 701/103; 123/674

(58) Field of Classification Search
USPC .......... 701/103–106, 109, 114, 115; 123/488, 123/674, 679, 694–696; 60/276, 285
See application file for complete search history.

(56) References Cited

U.S. PATENT DOCUMENTS

| | | | |
|---|---|---|---|
| 2003/0101975 A1* | 6/2003 | Yoshizawa et al. | 123/674 |
| 2003/0114979 A1* | 6/2003 | Yoshizawa et al. | 701/109 |
| 2003/0150441 A1* | 8/2003 | Saga | 123/674 |
| 2007/0198163 A1* | 8/2007 | Yasui et al. | 701/103 |
| 2008/0147297 A1* | 6/2008 | Nakagawa et al. | 701/103 |
| 2008/0257325 A1* | 10/2008 | Takubo | 123/672 |
| 2009/0306879 A1* | 12/2009 | Takubo | 701/104 |
| 2010/0217506 A1* | 8/2010 | Mizoguchi et al. | 701/109 |

FOREIGN PATENT DOCUMENTS

JP  4353070 B2  5/2006

* cited by examiner

*Primary Examiner* — John T. Kwon
*Assistant Examiner* — Johnny Hoang
(74) *Attorney, Agent, or Firm* — Ditthavong Mori & Steiner, P.C.

(57) ABSTRACT

An air-fuel ratio control apparatus for an internal-combustion engine includes an air-fuel-ratio sensor, a control-input calculator, an air-fuel-ratio controller, and a gain calculator. The air-fuel-ratio sensor is disposed in an exhaust channel in the internal-combustion engine and is configured to detect an air-fuel ratio in exhaust gas. The control-input calculator is configured to calculate a control input in accordance with an output value of the air-fuel-ratio sensor. The air-fuel-ratio controller is configured to perform a feedback control using the control input such that the output value of the air-fuel-ratio sensor reaches a target value. The gain calculator is configured to calculate a gain in accordance with the output value when the output value is leaner than the target value. The gain is to be used in calculating the control input.

15 Claims, 7 Drawing Sheets

US 8,694,227 B2

AIR-FUEL RATIO CONTROL APPARATUS AND AIR-FUEL RATIO CONTROL METHOD FOR INTERNAL-COMBUSTION ENGINE

CROSS-REFERENCE TO RELATED APPLICATIONS

The present application claims priority under 35 U.S.C. §119 to Japanese Patent Application No. 2010-145860, filed Jun. 28, 2010, entitled "Air-Fuel Ratio Control Apparatus For Internal-Combustion Engine." The contents of this application are incorporated herein by reference in their entirety.

BACKGROUND OF THE INVENTION

1. Field of the Invention

The present invention relates to an air-fuel ratio control apparatus and an air-fuel ratio control method for an internal-combustion engine.

2. Description of the Related Art

An example of such an air-fuel ratio controller of an internal-combustion engine in the related art is disclosed in Japanese Patent Application No. 4,353,070. A catalyst is disposed in en exhaust channel in the internal-combustion engine to purify exhaust gas. A lean air fuel (LAF) sensor is disposed upstream of the catalyst, and an oxygen concentration sensor is disposed downstream of the catalyst. The LAF sensor linearly detects the air-fuel ratio in exhaust gas, whereas the oxygen concentration sensor detects the air-fuel ratio in exhaust gas and has an output characteristic that suddenly changes near an exhaust-gas air-fuel ratio corresponding to a theoretical air-fuel ratio.

This air-fuel ratio controller performs feedback control of the fuel injection such that the exhaust-gas air-fuel ratio detected by the LAF sensor reaches a target air-fuel ratio. A correction value for correcting the fuel injection in accordance with the exhaust-gas air-fuel ratio detected by the oxygen concentration sensor is calculated.

When the exhaust-gas air-fuel ratio detected by the LAF sensor is richer than the theoretical air-fuel ratio and the exhaust-gas air-fuel ratio detected by the oxygen concentration sensor is leaner than the theoretical air-fuel ratio, it is determined that a lean stuck defect in which detection values are shifted to the leaner side has occurred in the oxygen concentration sensor, and the upper limit of the correction value is set to a value smaller value. In this way, the correction value is prevented from being set to an excessive value when a lean stuck defect has occurred in the oxygen concentration sensor so that the fuel injection is appropriately controlled.

SUMMARY OF THE INVENTION

According to one aspect of the present invention, an air-fuel ratio control apparatus for an internal-combustion engine includes an air-fuel-ratio sensor, a control-input calculator, an air-fuel-ratio controller, and a gain calculator. The air-fuel-ratio sensor is disposed in an exhaust channel in the internal-combustion engine and is configured to detect an air-fuel ratio in exhaust gas. The control-input calculator is configured to calculate a control input in accordance with an output value of the air-fuel-ratio sensor. The air-fuel-ratio controller is configured to perform a feedback control using the control input such that the output value of the air-fuel-ratio sensor reaches a target value. The gain calculator is configured to calculate a gain in accordance with the output value when the output value is leaner than the target value. The gain is to be used in calculating the control input.

According to another aspect of the present invention, an air-fuel ratio control method for an internal-combustion engine includes detecting an air-fuel ratio in exhaust gas discharged from the internal-combustion engine. A control input is calculated in accordance with an output value of the air-fuel-ratio. A feedback control is performed using the control input such that the output value reaches a target value. A gain is calculated in accordance with the output value when the output value is leaner than the target value. The gain is to be used in calculating the control input.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
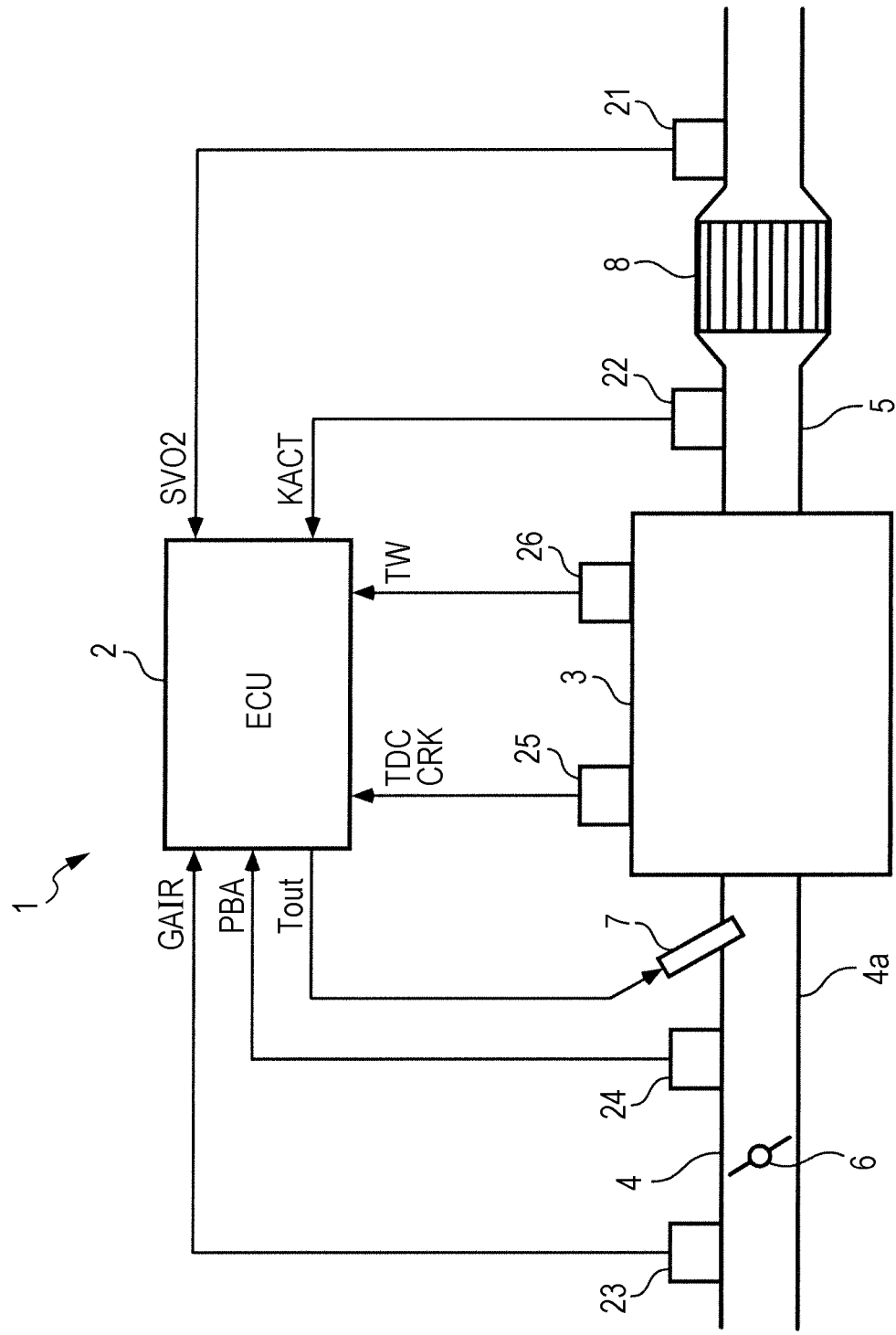
FIG. 1 illustrates an air-fuel ratio controller, together with an internal-combustion engine, according to an embodiment of the present invention.

The embodiments of the present invention will be described below with reference to the drawings, wherein like reference numerals designate corresponding or identical elements throughout the various drawings. As illustrated in FIG. 1, an air-fuel ratio controller 1 of this embodiment of the present invention includes an engine control unit (ECU) 2. The ECU 2 performs various control processes including air-fuel ratio control of an internal-combustion engine 3 (hereinafter referred to as "engine 3"). The engine 3 is, for example, a four-cylinder gasoline engine mounted on a vehicle (not shown). An inlet pipe 4 of the engine 3 has a throttle valve 6. Downstream of the throttle valve 6, there is an intake manifold 4a that has a fuel injection valve 7 (hereinafter referred to as "injector 7"). The valve opening time and the opening/closing timing of the injector 7 is controlled by the ECU 2 to control a fuel injection amount Tout and the fuel injection timing.

A catalyst 8 is provided downstream of an exhaust pipe 5. The catalyst 8 is a three-way catalyst and purges CO, HC, and NOx from the exhaust gas by oxidation-reduction.

An oxygen concentration sensor 21 (hereinafter referred to as "O2 sensor 21") is disposed downstream of the catalyst 8 in the exhaust pipe 5. The O2 sensor 21 detects the oxygen concentration in the exhaust gas downstream of the catalyst 8 and outputs a signal having a voltage corresponding to the oxygen concentration to the ECU 2.

Figure 2:
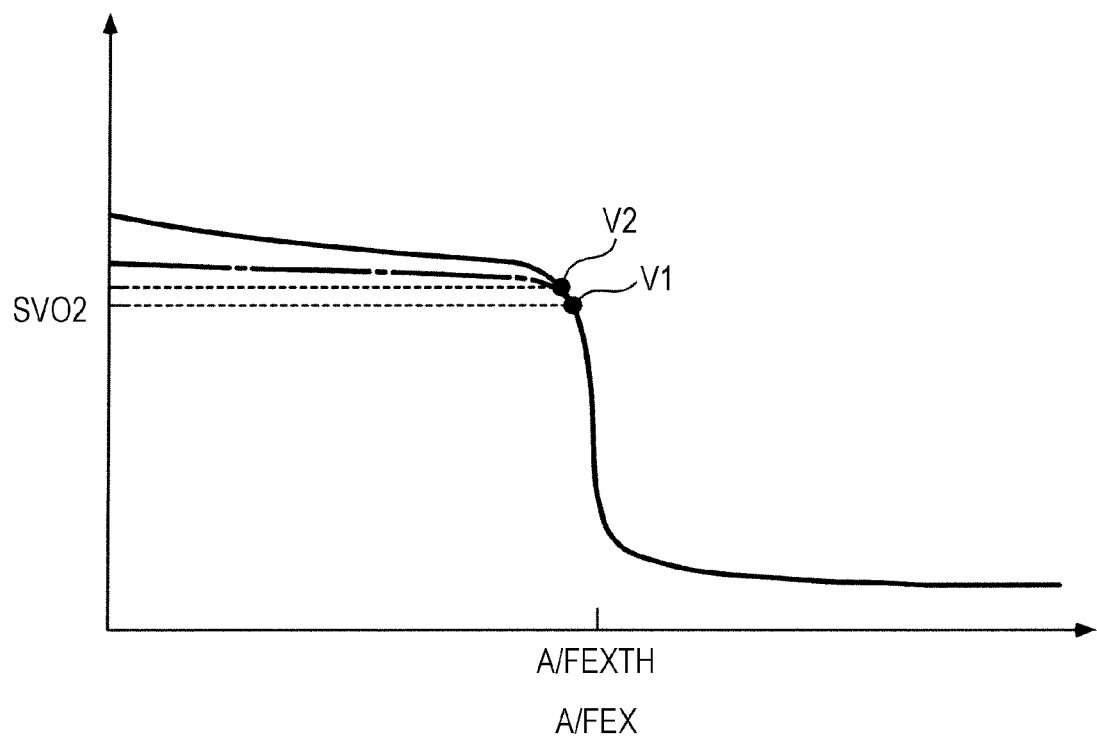
FIG. 2 illustrates the output characteristic of an oxygen concentration sensor.

As illustrated in FIG. 2, the O2 sensor 21 has an output characteristic that suddenly changes near an air-fuel ratio A/FEXTH in the exhaust gas equivalent to a theoretical air-fuel ratio in an air-fuel mixture (hereinafter referred to as "theoretical exhaust-gas air-fuel ratio A/FEXTH"). Specifically, a voltage value SVO2 of an output signal from the O2 sensor 21 (hereinafter referred to as "O2 output value SVO") is high (for example, 600 mV or greater) when an air-fuel mixture having an air-fuel ratio richer than the theoretical air-fuel ratio is combusted and the exhaust-gas air-fuel ratio A/FEX is rich, is low (for example, 200 mV or smaller) when an air-fuel mixture leaner than the theoretical air-fuel ratio is combusted and the exhaust-gas air-fuel ratio A/FEX is lean, and suddenly changes between the above-described high and low values when an air-fuel mixture having an air-fuel ratio close to the theoretical air-fuel ratio and when the exhaust-gas air-fuel ratio A/FEX is close to the theoretical exhaust-gas air-fuel ratio A/FEXTH.

The dotted lines in the drawing represent an output characteristic of the O2 sensor 21 when the output is saturated due to sulfur poisoning, etc. As indicated by the dotted lines, when sulfur poisoning occurs, the output of the O2 sensor 21 is saturated in a region in which the exhaust-gas air-fuel ratio A/FEX is richer than the theoretical exhaust-gas air-fuel ratio A/FEXTH; the corresponding O2 output value SVO2 is smaller than an unsaturated normal value (solid line), and the larger the difference with the normal value is, the richer the exhaust-gas air-fuel ratio A/FEX is.

An LAF sensor 22 is disposed upstream of the catalyst 8 in the exhaust pipe 5. The LAF sensor 22 linearly detects the oxygen concentration in the exhaust gas within a wide range of theoretical exhaust-gas air-fuel ratios A/FEXTH from rich to lean and outputs to the ECU 2 a detection signal representing the exhaust-gas air-fuel ratio KACT corresponding to the oxygen concentration (hereinafter referred to as "real air-fuel ratio KACT"). The real air-fuel ratio KACT and a target air-fuel ratio KCMD, which is described below, are represented as equivalent ratios.

An air flowmeter 23 is disposed upstream of the throttle valve 6 in the inlet pipe 4, and an intake pressure sensor 24 is disposed downstream. The air flowmeter 23 detects the mass of air flowing through the inlet pipe 4 (hereinafter referred to as "air mass GAIR"). The intake pressure sensor 24 detects the pressure of intake air (hereinafter referred to as "intake pressure PBA"). Detection signals corresponding to the detected values are output to the ECU 2. The ECU 2 also receives from a water-temperature sensor 26 a detection signal representing the temperature of cooling water of the engine 3 (hereinafter referred to as "engine water temperature TW").

A crank-angle sensor 25 is disposed on a crank shaft (not shown) of the engine 3. The crank-angle sensor 25 outputs CRK signals and TDC signals, which are pulsed signals, to the ECU 2 as the crank shaft rotates.

A CRK signal is output at each predetermined crank angle (for example, 30°). The ECU 2 calculates the rotational speed of the engine 3 (hereinafter referred to as "engine rational speed NE") on the basis of the CRK signal. A TDC signal indicates that a piston (not shown) of one of the cylinders (not shown) is at a predetermined crank-angle position near the top dead center (TDC) at the start of the intake process. Since a four-cylinder gasoline engine is used in this embodiment, a TDC signal is output at each 180° crank angle.

The ECU 2 is constituted of a microcomputer (not shown) including a CPU, a RAM, a ROM, and an input/output interface (which are all not shown). In response to the detection signals from the above-described sensors 21 to 26, the ECU 2 performs various calculations for air-fuel ratio control, etc., on the basis of control programs etc., stored in the ROM. In this embodiment, the ECU 2 corresponds to a control-input calculating unit, an air-fuel-ratio control unit, and a gain calculating unit.

The air-fuel-ratio control process performed by the ECU 2 will be described below with reference to FIGS. 3 to 7. In the air-fuel-ratio control process, the target air-fuel ratio KCMD is calculated such that the O2 output value SVO2 reaches a target value SVO2CMD and calculates the fuel injection amount Tout such that the real air-fuel ratio KACT reaches the calculated target air-fuel ratio KCMD so as to control the air-fuel ratio in the air-fuel mixture combusted at the engine 3 and the exhaust-gas air-fuel ratio A/FEX. In this embodiment, to reduce NOx, the target value SVO2CMD is set to a value slightly larger (for example, 650 mV) than a value corresponding to the theoretical exhaust-gas air-fuel ratio A/FEXTH (for example, 590 mV), i.e., set slightly richer.

Figure 3:
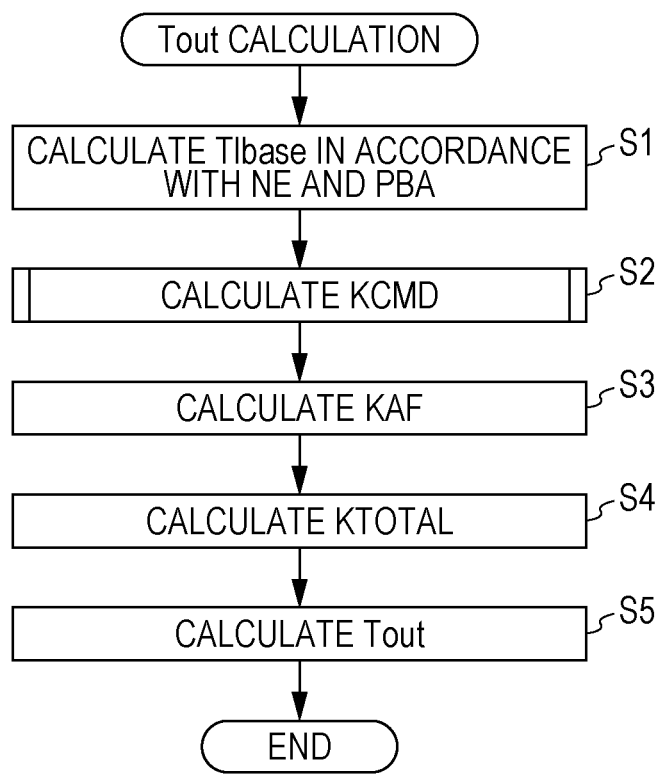
FIG. 3 is a flow chart illustrating a calculation process of fuel injection amount.

FIG. 3 illustrates the calculation process of the fuel injection amount Tout. This process is performed in synchronization with the generation of a TDC signal. In Step (abbreviated as "S1" (other steps are also abbreviated in the same manner)) of the process, a predetermined map (not shown) is searched in accordance with the engine rational speed NE and the intake pressure PBA to calculate a basic fuel quantity TIbase. The basic fuel quantity TIbase is the basic value of the fuel injection amount Tout and is set large when the engine rational speed NE and/or the intake pressure PBA are high. To calculate the basic fuel quantity TIbase, the air mass GAIR detected at the air flowmeter 23 may be used. In Step 2, the target air-fuel ratio KCMD is calculated. Details of the calculation will be described below.

In Step 3, an air-fuel-ratio correction coefficient KAF is calculated so that the real air-fuel ratio KACT detected at the LAF sensor 22 converges to the target air-fuel ratio KCMD by PID feedback control. The air-fuel-ratio correction coefficient KAF may be calculated using a self-tuning regulator (STR) or the like.

In Step 4, a total correction coefficient KTOTAL is calculated. The total correction coefficient KTOTAL is calculated by multiplying various correction coefficients including a water-temperature correction coefficient calculated in accordance with the engine water temperature TW.

In Step 5, the basic fuel quantity TIbase, the target air-fuel ratio KCMD, the air-fuel-ratio correction coefficient KAF, and the total correction coefficient KTOTAL, which are respectively calculated in Steps 1 to 4, are used to calculate the fuel injection amount Tout using the following Expression 1, and then the process ends.

$$Tout = TIbase \cdot KCMD \cdot KAF \cdot KTOTAL \qquad (1)$$

Figure 4:
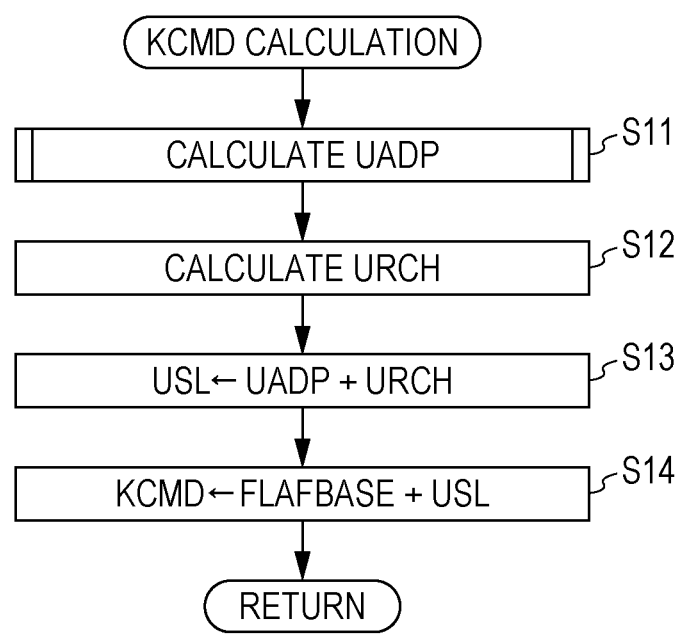
FIG. 4 is a flow chart illustrating a calculation process of target air-fuel ratio.
Figure 5:
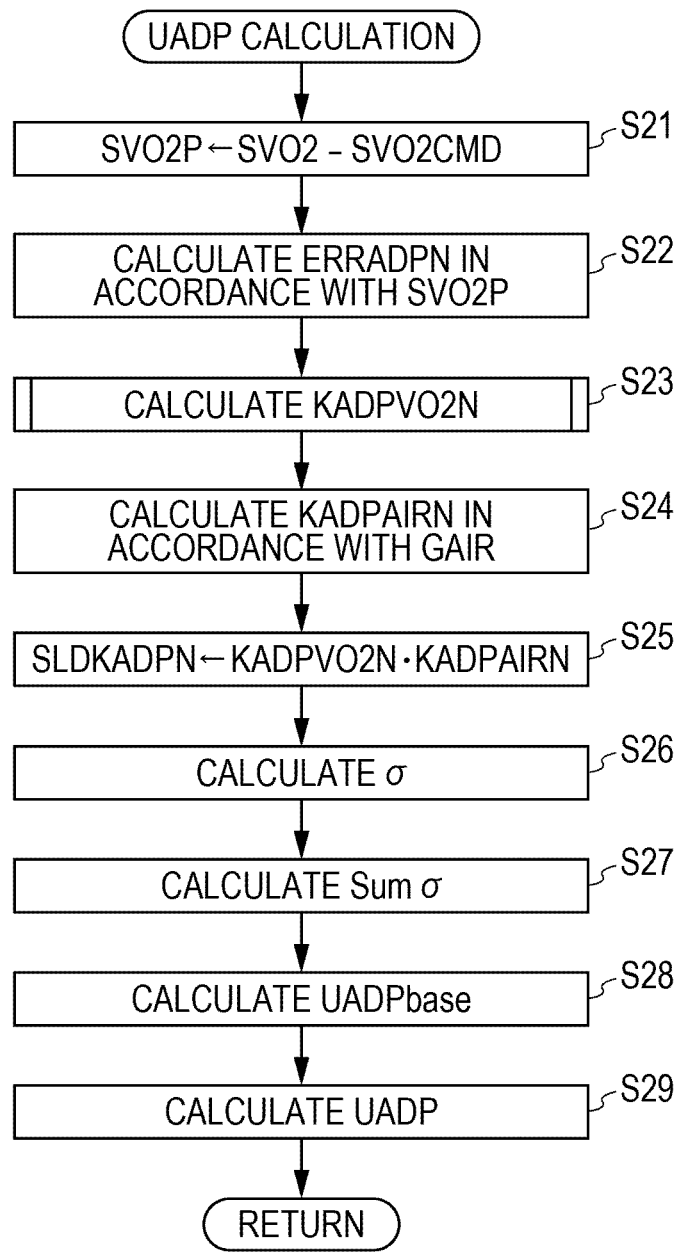
FIG. 5 is a flow chart illustrating a calculation process of adaptation-law input.

The calculation process of the target air-fuel ratio KCMD performed in Step 2 in FIG. 3 will be described below with reference to FIG. 4. In this process, the target air-fuel ratio KCMD is calculated on the basis of a sliding mode control algorithm represented by Expressions 2 to 7, which are described below. In Step 11 of this process, an adaptation-law input UADP is calculated. FIG. 5 illustrates a subroutine.

Figure 6:
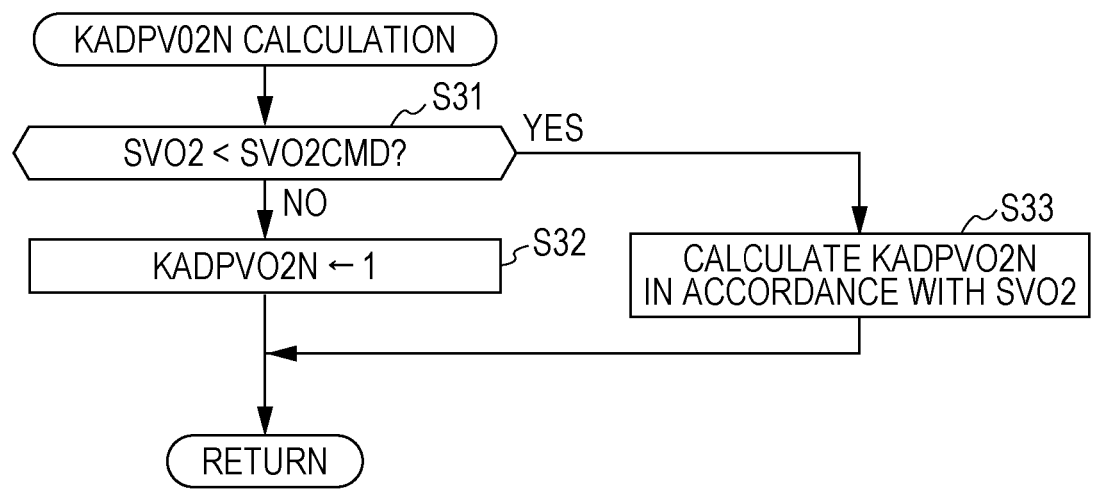
FIG. 6 is a flow chart illustrating a calculation process of a first gain.

In Step 21 of this process, the difference of the O2 output value SVO2 and the target value SVO2CMD is calculated as an output deviation SVO2P. In Step 22, a conversion value ERRADPN is calculated in accordance with the calculated output deviation SVO2P. In Step 23, a first gain KADPVO2N is calculated. FIG. 6 illustrates a subroutine.

In Step 31 of this process, it is determined whether the O2 output value SVO2 is smaller than the target value SVO2CMD. When the result is NO and the O2 output value SVO2 is richer than the target value SVO2CMD, the first gain KADPVO2N is set to 1.0, and then the process ends.

Figure 7:
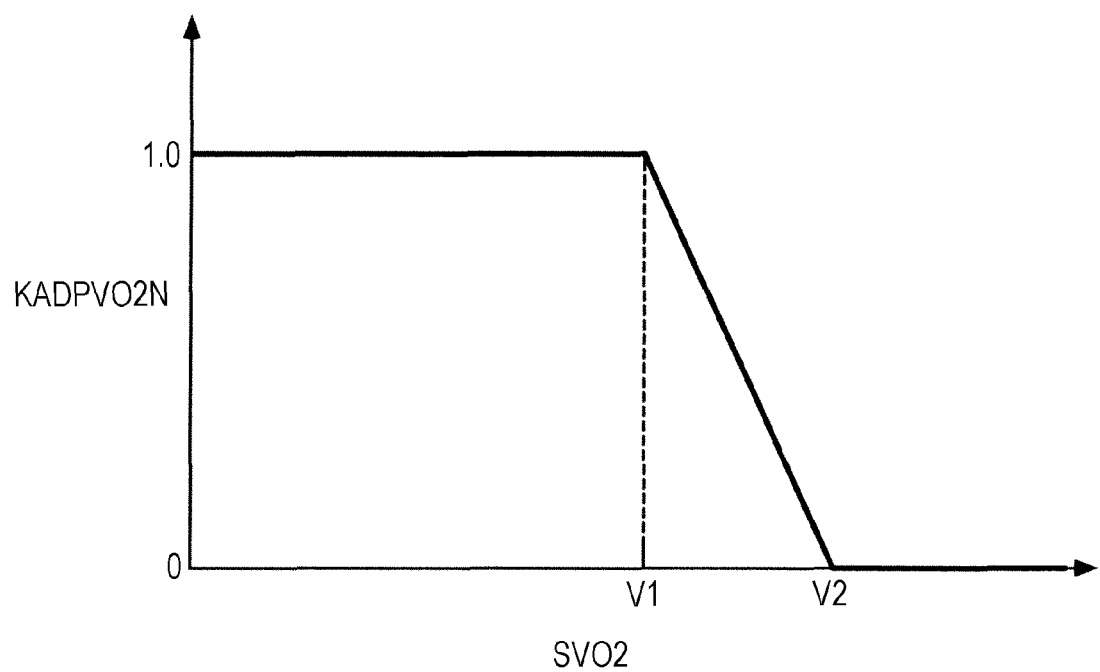
FIG. 7 is a map for calculating the first gain.

In contrast, when the result of Step 31 is YES and the O2 output value SVO2 is leaner than the target value SVO2CMD, in Step 33, by searching the map illustrated in FIG. 7, the first gain KADPVO2N is calculated in accordance with the O2 output value SVO2, and then the process ends.

In the map, the first gain KADPVO2N is set to 1.0 within the range in which the O2 output value SVO2 is smaller than or equal to a first predetermined value V1. In the range in which the O2 output value SVO2 is larger than the first predetermined value V1 and smaller than a second predetermined value V2, the larger the O2 output value SVO2 is, the smaller the first gain KADPVO2N is. In the range in which the O2 output value SVO2 is larger than or equal to the second predetermined value V2, the first gain KADPVO2N is set to zero.

As illustrated in FIG. 2, at the first predetermined value V1, the O2 output value SVO2 starts to decrease due to saturation of the output of the O2 sensor 21. At the second predetermined value V2, the difference between the normal value and the O2 output value SVO2 starts to increase when the output of the O2 sensor 21 is saturated. The predetermined values V1 and V2 are determined in advance through experiments etc., and in this embodiment, are set to 630 mV and 650 mV, respectively.

Accordingly, the first gain KADPVO2N is set to 1.0 within a range (SVO2≤V1) in which the O2 output value SVO2 substantially does not decrease due to saturation of the output of the O2 sensor 21, is set to zero in a range (SVO2≥V2) in which the difference between the normal value and the O2 output value SVO2 is large, and is set to linearly decrease from 1.0 to 0 as the O2 output value SVO2 increases in a range (V1<SVO2<V2) between the former two ranges.

Referring back to FIG. 5, in Step 24 following Step 23, a predetermined map (not shown) is searched to calculate a second gain KADPAIRN in accordance with the air mass GAIR. In Step 25, by multiplying the above-described first gain KADPVO2N by the second gain KADPAIRN, a total gain SLDKADPN is calculated.

In Step 26, the current and previous conversion values ERRADPN(k) and ERRADPN(k−1) and a predetermined response assignment parameter s (−1<s<0) are used to calculate a switching function σ(k) using Expression 2.

$$\sigma(k) = \text{ERRADPN}(k) + s \cdot \text{ERRADPN}(k-1) \quad (2)$$

In Step 27, the integral value Sumσ(k) of the switching function σ(k) is calculated using Expression 3.

$$\text{Sum}\sigma(k) = \text{Sum}\sigma(k-1) + \text{SLDKADPN} \cdot \sigma(k) \quad (3)$$

In Step 28, the calculated integral value Sumσ(k) and the total gain SLDKADPN are used to calculate a basic value UADPbase of the adaptation-law input using Expression 4.

$$\text{UADPbase}(k) = \text{UADPbase}(k-1) + \text{SLDKADPN} \cdot \sigma(k)$$
$$= \text{Sum}\sigma(k) \quad (4)$$

In Step 29, by limiting the calculated basic value UADPbase of the adaptation-law input, the adaptation-law input UADP is calculated, and then the process ends. Specifically, in the limiting process, the adaptation-law input UADP is set to a predetermined upper limit UADPLMTH when the basic value UADPbase is larger than the upper limit UADPLMTH. In contrast, when the basic value UADPbase is smaller than a lower limit UADPLMTL, the adaptation-law input UADP is set to the lower limit UADPLMTL. When the basic value UADPbase does not satisfy such conditions, the adaptation-law input UADP is set to the basic value UADPbase.

Referring back to FIG. 4, in Step 12 following Step 11, a predetermined reaching-law gain KRCH and the switching function σ(k) are used to calculate a basic value URCHbase of the reaching-law input using Expression 5, and a value obtained by limiting the basic value URCHbase is determined as the final reaching-law input URCH.

$$\text{URCH} = \text{KRCH} \cdot \sigma(k) \quad (5)$$

In Step 13, the calculated adaptation-law input UADP and the reaching-law input URCH are used to calculate a correction value USL using Expression 6.

$$\text{USL} = \text{UADP} + \text{URCH} \quad (6)$$

In Step 14, a predetermined air-fuel-ratio basic value FLAFBASE and the calculated correction value USL are used to calculate the target air-fuel ratio KCMD using Expression 7, and then the process ends.

$$\text{KCMD} = \text{FLAFBASE} - \text{USL} \quad (7)$$

As described above, in this embodiment, when the O2 output value SVO2 is smaller than the target value SVO2CMD and the exhaust-gas air-fuel ratio A/FEX is rich, the first gain KADPVO2N is calculated in accordance with the O2 output value SVO2. Thus, when the output of the O2 sensor 21 is saturated, the first gain KADPVO2N can be appropriately calculated while appropriately compensating the decrease in the O2 output value SVO2 in the range richer than the exhaust-gas air-fuel ratio A/FEX. Furthermore, since the target air-fuel ratio KCMD calculated using the first gain KADPVO2N calculated in this way is used to perform feedback control on the basis of the O2 output value SVO2 and the target value SVO2CMD, the precision of exhaust-gas air-fuel ratio A/FEX control can be improved.

When the O2 output value SVO2 is larger than the first predetermined value V1, the larger the O2 output value SVO2 is, the smaller the calculated first gain KADPVO2N is. In this way, the total gain SLDKADPN can be appropriately calculated in accordance with the output characteristic in which, when the output of the O2 sensor 21 is saturated, the larger the difference between the O2 output value SVO2 and the normal value is, the richer the exhaust-gas air-fuel ratio A/FEX is. As a result, the target air-fuel ratio KCMD can be even more appropriately calculated, and thus, the precision of exhaust-gas air-fuel ratio A/FEX control can be improved even more.

By using the first gain KADPVO2N calculated appropriately as described above to calculate the adaptation-law input UADP, the adaptation-law input UADP can be prevented from increasing inappropriately and unlimitedly. Since the reaching-law input URCH is calculated using the predetermined reaching-law gain KRCH, not the first gain KADPVO2N, even when the first gain KADPVO2N is zero and the adaptation-law input UADP is zero, these do not affect the feedback response, etc.

The target air-fuel ratio KCMD is calculated by sliding mode control such that the O2 output value SVO2 is set to the target value SVO2CMD. Accordingly, by using the exhaust-gas air-fuel ratio A/FEX detected at the O2 sensor 21, the target air-fuel ratio KCMD can be appropriately calculated by sliding mode control that is less affected by disturbance and converges quickly to the target value. Since the fuel injection amount Tout is controlled using the target air-fuel ratio KCMD calculated in this way set the real air-fuel ratio KACT detected at the LAF sensor 22 at the target air-fuel ratio KCMD, the air-fuel ratio in the air-fuel mixture and the exhaust-gas air-fuel ratio A/FEX can be even more precisely controlled.

The present invention is not limited to the embodiment described above and may include various modifications. For example, in the above-described embodiment, the O2 sensor 21 disposed downstream of the catalyst 8 is an inversion type sensor. However, it may be a sensor that linearly detects the oxygen concentration in the exhaust gas, which is the same type as the LAF sensor 22.

In the embodiment described above, the target air-fuel ratio KCMD is calculated through sliding mode control. However, it may be calculated through PID feedback control. In such a case, the integral term I of the feedback control is calculated using an output deviation SVO2P and an integral term gain KI using Expression 8. The embodiment of the present invention is applied to the calculation of the integral term gain KI.

$$I(k)=KI \cdot SVO2P+I(k-1) \qquad (8)$$

In the embodiment described above, when the O2 output value SVO2 is within the range of V1<SVO2<V2, the first gain KADPVO2N is set such that it linearly decreases as the O2 output value SVO2 increases. The first gain KADPVO2N may instead by set such that the level of decrease changes. The first gain KADPVO2N may be calculated using a predetermined expression, instead of the map according to the embodiment.

The above-described embodiment of the present invention is applied to a gasoline engine mounted on a vehicle. The embodiment of the present invention, however, is not limited thereto and may be applied not only to gasoline engines but also to other various different engines, such as diesel engines. Moreover, the embodiment of the present invention may be applied not only to vehicle engines but also to, for example, a ship propulsion engine, such as an outboard engine in which the crank shaft is disposed vertically. Detailed configurations may be appropriately modified within the scope of the present invention.

In the embodiment of the present invention, "air-fuel ratio in exhaust gas" is the weight ratio of burnable gas to air in the exhaust gas. The air-fuel ratio controller calculates a control input in accordance with an output value of the air-fuel-ratio sensor and performs feedback control using the calculated control input such that the output value of the air-fuel-ratio sensor reaches a predetermined target value.

The above-described air-fuel-ratio sensor uses an electromotive force of a device thereof and outputs a voltage corresponding to the exhaust-gas air-fuel ratio as a detection signal. Therefore, when there is a cause, such as sulfur poisoning of the device, preventing the generation of the electromotive force, the output tends to be saturated due to the insufficiency of the electromotive force. In such a case, the output value of the air-fuel-ratio sensor is leaner than a normal value, which is not saturated.

According to the embodiment of the present invention, when the output value of the air-fuel-ratio sensor is leaner than the target value, the gain to be used in calculating the control input is calculated in accordance with the output value. Thus, when the output of the air-fuel-ratio sensor is saturated, a change in the output characteristic due to this can be appropriately compensated while the gain is appropriately calculated. Since the gain calculated in this way is used to calculate a control input, and this control input is used to perform feedback control based on the output value of the air-fuel-ratio sensor and the target value, the precision of air-fuel ratio control can be improved.

According to the embodiment of the present invention, in the air-fuel ratio controller of an internal-combustion engine, when the output value of the air-fuel-ratio sensor is richer than a value corresponding to a theoretical air-fuel ratio, the richer the output is, the smaller the gain calculated by the gain calculating unit may be (Step 33 in FIG. 6, and FIG. 7).

Saturation of the output of the air-fuel-ratio sensor tends to occur when the exhaust-gas air-fuel ratio is richer than the value corresponding to the theoretical air-fuel ratio, and the richer the exhaust-gas air-fuel ratio is, the greater the difference between the normal value and the output value of the air-fuel-ratio sensor at saturation is. With this configuration, when the output value is richer than the value corresponding to the theoretical air-fuel ratio, the richer the output value is, the smaller the gain is. Accordingly, the gain can be appropriately calculated in accordance with the output characteristic of the air-fuel-ratio sensor when the output is saturated. As a result, the control input can be even more appropriately calculated, and thus, the precision of air-fuel ratio control can be improved even more.

According to the embodiment of the present invention, in the air-fuel ratio controller of an internal-combustion engine, the control input may include an integral term and the gain may be used to calculate the integral term (Steps 24,25, and 28 in FIG. 5).

According to this configuration, the gain calculated may be used to calculate the integral term in the control input. Since the integral term is calculated by cumulative addition, the influence of the precision of the gain is large relative to other feedback components. Thus, by using the gain calculated appropriately as described above in calculating the integral term, the integral term can be prevented from increasing inappropriately and unlimitedly. Since the feedback components other than the integral term are not cumulatively calculated, the influence of the difference with the output value of the air-fuel-ratio sensor is small. Thus, by not using the gain for these feedback components, feedback response, etc., can be ensured.

According to the embodiment of the present invention, in the air-fuel ratio controller of an internal-combustion engine, the air-fuel-ratio sensor may be disposed downstream of a catalyst purifying exhaust gas discharged from the internal-combustion engine and may include an upstream air-fuel-ratio sensor (LAF sensor 22) being disposed upstream of the catalyst, detecting the air-fuel ratio in the exhaust gas, and having an output characteristic linearly changing in accordance with the air-fuel ratio in the exhaust gas; the air-fuel-ratio control unit may calculate a target air-fuel ratio (target air-fuel ratio KCMD) as the control input by sliding mode control such that the output value of the air-fuel-ratio sensor reaches a target value (target value SVO2CMD) (FIG. 4) and may control the quantity of fuel (fuel injection amount Tout) supplied to the internal-combustion engine such that the air-fuel ratio in the exhaust gas detected by the upstream air-fuel-ratio sensor reaches the target air-fuel ratio; and the control input may include an adaptation-law input (adaptation-law input UADP) calculated using the gain.

According to this configuration, the air-fuel-ratio sensor may be provided downstream of the catalyst, and the upstream air-fuel-ratio sensor may be disposed upstream of the catalyst and may have an output characteristic linearly changing in accordance with the air-fuel ratio in the exhaust gas. The target air-fuel ratio, which is a control input, is calculated by sliding mode control such that the output value of the air-fuel-ratio sensor reaches the target value. Accordingly, by using the exhaust-gas air-fuel ratio detected at the air-fuel-ratio sensor, the target air-fuel ratio can be appropriately calculated by sliding mode control that is less affected by disturbance and converges quickly to the target value.

Since the target air-fuel ratio calculated as described above is used to control the quantity of fuel supplied to the internal-combustion engine such that the exhaust-gas air-fuel ratio detected by the air-fuel-ratio sensor reaches the target air-fuel ratio, the precision of the air-fuel ratio control can be improved even more. The control input includes the adaptation-law input of the sliding mode control, and the adaptation-law input corresponds to the integral term and is calculated using the gain. Thus, the advantage of the embodiment described above can be achieved by applying the gain to the integral term.

Obviously, numerous modifications and variations of the present invention are possible in light of the above teachings. It is therefore to be understood that within the scope of the appended claims, the invention may be practiced otherwise than as specifically described herein.

What is claimed is:

1. An air-fuel ratio control apparatus for an internal-combustion engine, comprising:
    an air-fuel-ratio sensor disposed in an exhaust channel in the internal-combustion engine and provided to detect an air-fuel ratio in exhaust gas;
    a control-input calculator to calculate a control input in accordance with an output value of the air-fuel-ratio sensor;
    an air-fuel-ratio controller to perform a feedback control using the control input such that the output value of the air-fuel-ratio sensor reaches a target value; and
    a gain calculator to calculate a gain in accordance with the output value when the output value is leaner than the target value, the gain being used in calculating the control input compensates for a change in output saturation characteristic of the air-fuel-ratio sensor.

2. The air-fuel ratio control apparatus according to claim 1, wherein, when the output value of the air-fuel-ratio sensor is richer than a value corresponding to a theoretical air-fuel ratio, the gain reduces as the output value becomes richer.

3. The air-fuel ratio control apparatus according to claim 1, wherein the control input includes an integral term, and wherein the gain is used to calculate the integral term.

4. The air-fuel ratio control apparatus according to claim 1,
    wherein the air-fuel-ratio sensor is disposed downstream of a catalyst purging exhaust gas discharged from the internal-combustion engine,
    wherein the air-fuel-ratio sensor includes an upstream air-fuel-ratio sensor disposed upstream of the catalyst, the upstream air-fuel-ratio sensor being configured to detect the air-fuel ratio in the exhaust gas, and having an output characteristic linearly changing in accordance with the air-fuel ratio in the exhaust gas,
    wherein the air-fuel-ratio controller is configured to calculate a target air-fuel ratio as the control input by sliding mode control such that the output value of the air-fuel-ratio sensor reaches the target value,
    wherein the air-fuel-ratio controller is configured to control a quantity of fuel supplied to the internal-combustion engine such that the air-fuel ratio in the exhaust gas detected by the upstream air-fuel-ratio sensor reaches the target air-fuel ratio, and
    wherein the control input includes an adaptation-law input calculated using the gain.

5. The air-fuel ratio control apparatus according to claim 2, wherein the control input includes an integral term, and wherein the gain is used to calculate the integral term.

6. The air-fuel ratio control apparatus according to claim 2,
    wherein the air-fuel-ratio sensor is disposed downstream of a catalyst purging exhaust gas discharged from the internal-combustion engine,
    wherein the air-fuel-ratio sensor includes an upstream air-fuel-ratio sensor disposed upstream of the catalyst, the upstream air-fuel-ratio sensor being configured to detect the air-fuel ratio in the exhaust gas, and having an output characteristic linearly changing in accordance with the air-fuel ratio in the exhaust gas,
    wherein the air-fuel-ratio controller is configured to calculate a target air-fuel ratio as the control input by sliding mode control such that the output value of the air-fuel-ratio sensor reaches the target value,
    wherein the air-fuel-ratio controller is configured to control a quantity of fuel supplied to the internal-combustion engine such that the air-fuel ratio in the exhaust gas detected by the upstream air-fuel-ratio sensor reaches the target air-fuel ratio, and
    wherein the control input includes an adaptation-law input calculated using the gain.

7. The air-fuel ratio control apparatus according to claim 3,
    wherein the air-fuel-ratio sensor is disposed downstream of a catalyst purging exhaust gas discharged from the internal-combustion engine,
    wherein the air-fuel-ratio sensor includes an upstream air-fuel-ratio sensor disposed upstream of the catalyst, the upstream air-fuel-ratio sensor being configured to detect the air-fuel ratio in the exhaust gas, and having an output characteristic linearly changing in accordance with the air-fuel ratio in the exhaust gas,
    wherein the air-fuel-ratio controller is configured to calculate a target air-fuel ratio as the control input by sliding mode control such that the output value of the air-fuel-ratio sensor reaches the target value,
    wherein the air-fuel-ratio controller is configured to control a quantity of fuel supplied to the internal-combustion engine such that the air-fuel ratio in the exhaust gas detected by the upstream air-fuel-ratio sensor reaches the target air-fuel ratio, and
    wherein the control input includes an adaptation-law input calculated using the gain.

8. The air-fuel ratio control apparatus according to claim 5,
    wherein the air-fuel-ratio sensor is disposed downstream of a catalyst purging exhaust gas discharged from the internal-combustion engine,
    wherein the air-fuel-ratio sensor includes an upstream air-fuel-ratio sensor disposed upstream of the catalyst, the upstream air-fuel-ratio sensor being configured to detect the air-fuel ratio in the exhaust gas, and having an output characteristic linearly changing in accordance with the air-fuel ratio in the exhaust gas,
    wherein the air-fuel-ratio controller is configured to calculate a target air-fuel ratio as the control input by sliding mode control such that the output value of the air-fuel-ratio sensor reaches the target value,
    wherein the air-fuel-ratio controller is configured to control a quantity of fuel supplied to the internal-combustion engine such that the air-fuel ratio in the exhaust gas detected by the upstream air-fuel-ratio sensor reaches the target air-fuel ratio, and
    wherein the control input includes an adaptation-law input calculated using the gain.

9. The air-fuel ratio control apparatus according to claim 2,
    wherein, if the output value of the air-fuel-ratio sensor is richer than a first predetermined value at which the output value starts to decrease due to saturation of an output of the air-fuel-ratio sensor and if the output value of the air-fuel-ratio sensor is leaner than a second predetermined value at which a difference between a normal value and the output value starts to increase when the output of the air-fuel-ratio sensor is saturated, the gain calculator calculates the gain so that the gain reduces as the output value becomes richer, the first predetermined value being smaller than the second predetermined value, and wherein, when the output value of the air-fuel-ratio sensor is equal to or richer than the second predetermined value, the gain calculator sets the gain to be zero.

10. An air-fuel ratio control apparatus for an internal-combustion engine, comprising:
air-fuel-ratio detecting means for detecting an air-fuel ratio in exhaust gas, the air-fuel-ratio detecting means being disposed in an exhaust channel in the internal-combustion engine;
control-input calculating means for calculating a control input in accordance with an output value of the air-fuel-ratio detecting means;
air-fuel-ratio control means for performing a feedback control using the control input such that the output value of the air-fuel-ratio detecting means reaches a target value; and
gain calculating means for calculating a gain in accordance with the output value when the output value is leaner than the target value, the gain being used in calculating the control input compensates for a change in output saturation characteristic of the air-fuel-ratio detecting means.

11. The air-fuel ratio control apparatus according to claim 10,
wherein, when the output value of the air-fuel-ratio detecting means is richer than a value corresponding to a theoretical air-fuel ratio, the gain reduces as the output value becomes richer.

12. The air-fuel ratio control apparatus according to claim 11,
wherein, if the output value of the air-fuel-ratio detecting means is richer than a first predetermined value at which the output value starts to decrease due to saturation of an output of the air-fuel-ratio detecting means and if the output value of the air-fuel-ratio detecting means is leaner than a second predetermined value at which a difference between a normal value and the output value starts to increase when the output of the air-fuel-ratio detecting means is saturated, the gain calculating means calculates the gain so that the gain reduces as the output value becomes richer, the first predetermined value being smaller than the second predetermined value, and wherein, when the output value of the air-fuel-ratio detecting means is equal to or richer than the second predetermined value, the gain calculating means sets the gain to be zero.

13. An air-fuel ratio control method for an internal-combustion engine, comprising:
detecting an air-fuel ratio in exhaust gas discharged from the internal-combustion engine;
calculating a control input in accordance with an output value of the air-fuel-ratio;
performing a feedback control using the control input such that the output value reaches a target value; and
calculating a gain in accordance with the output value when the output value is leaner than the target value, the gain being used in calculating the control input compensates for a change in output saturation characteristic of an air-fuel-ratio sensor used for detecting the air-fuel ratio.

14. The air-fuel ratio control method according to claim 13,
wherein, when the output value of an air-fuel-ratio sensor used for detecting the air-fuel ratio is richer than a value corresponding to a theoretical air-fuel ratio, the gain reduces as the output value becomes richer.

15. The air-fuel ratio control method according to claim 14,
wherein, if the output value of the air-fuel-ratio sensor is richer than a first predetermined value at which the output value starts to decrease due to saturation of an output of the air-fuel-ratio sensor and if the output value of the air-fuel-ratio sensor is leaner than a second predetermined value at which a difference between a normal value and the output value starts to increase when the output of the air-fuel-ratio sensor is saturated, the gain is calculated so that the gain reduces as the output value becomes richer, the first predetermined value being smaller than the second predetermined value, and
wherein, when the output value of the air-fuel-ratio sensor is equal to or richer than the second predetermined value, the gain is set to be zero.

* * * * *